Sept. 11, 1962 H. D. CRANE 3,054,066

ELECTRICAL AMPLIFICATION SYSTEM

Filed Feb. 13, 1959 2 Sheets-Sheet 1

HEWITT D. CRANE
INVENTOR.

BY Lyon & Lyon

ATTORNEYS

ELECTRICAL AMPLIFICATION SYSTEM

Filed Feb. 13, 1959

HEWITT D. CRANE
INVENTOR.

BY Lyon & Lyon

ATTORNEYS

United States Patent Office 3,054,066
Patented Sept. 11, 1962

3,054,066
ELECTRICAL AMPLIFICATION SYSTEM

Hewitt D. Crane, Palo Alto, Calif., assignor to Packard-Bell Electronics Corporation, Los Angeles, Calif., a corporation of California Filed Feb. 13, 1959, Ser. No. 793,009
9 Claims. (Cl. 330—14)

This invention relates to an electrical signal amplification system and, more particularly, to an improved arrangement for amplifying analog signals employing digital pulse-width modulation techniques.

It is an object of this invention to provide a novel amplificaion system which has the ability to amplify signals over a wide frequency range.

Another object of this invention is to provide an amplification system wherein the relationship between the input signals to be amplified and the amplified output signals is a linear one.

Another object of this invention is to provide an amplification system having a power efficiency approaching 100 percent.

Yet another object of this invention is the provision of an amplification system which can drive a low-impedance load, such as a loudspeaker voice coil, without requiring an output transformer.

Another object of the present invention is the provision of an amplification system employing transistors wherein the transistors are operated, either in the nonconducting or in the saturation state.

These and other objects of the invention are achieved in a novel system for amplifying signals from a source. This system includes a means for converting these signals into a train of representative width-modulated pulses. These width-modulated pulses are applied to apparatus which applies voltage with alternately reversed polarity across a load in response to the width-modulated pulses. The voltage applied to the load has a constant amplitude, but its duration in each direction of its application is determined by the width of the pulse which occurs during the time of said direction of application. The current which flows through the load as a result of the applied voltage is determined by the nature of the load.

In one embodiment of the invention, the width-modulated pulses representative of the varying amplitude signals at the source are generated by apparatus including a magnetic core which has two opposite states of saturation. This core is driven from one state of saturation to the opposite state of saturation repetitively. However, the time required for driving the core between these two saturation states depends upon the amplitude of the signal sought to be amplified. An output coil or coils on the magnetic core will have induced therein a train of width-modulated pulses of alternately opposite polarity, which are representative of the signals sought to be amplified.

In a second embodiment of the invention, a magnetic core is also employed having at least one state of magnetic saturation. Means are provided for driving the magnetic core from the one toward the other state of saturation during regularly occurring intervals having predetermined identical durations an amount determined by the amplitude of the signal sought to be amplified during said interval. At the termination of said interval, means are provided for driving said magnetic core back to its one state of magnetic saturation at a constant rate. An output coil or coils coupled to said magnetic core will have induced therein a train of pulses which can be considered essentially of opposite polarity which have a width representative of the signals sought to be amplified.

Either of the pulse-width modulated trains of pulses may be applied to amplifying apparatus including a pair of transistors which are alternately switched from the saturated conductive condition to the nonconductive condition in response to the alternate polarity pulse-width modulated pulses. The interval during which the conductive transistors conduct is determined by the interval of the pulse which effectively enables the transistor conduction. A load is connected to these two transistors so that one conductive transistor applies a voltage across the load with one polarity and the other conductive transistor applies a voltage across the load with the opposite polarity.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2, 3, 4, 8, 9:
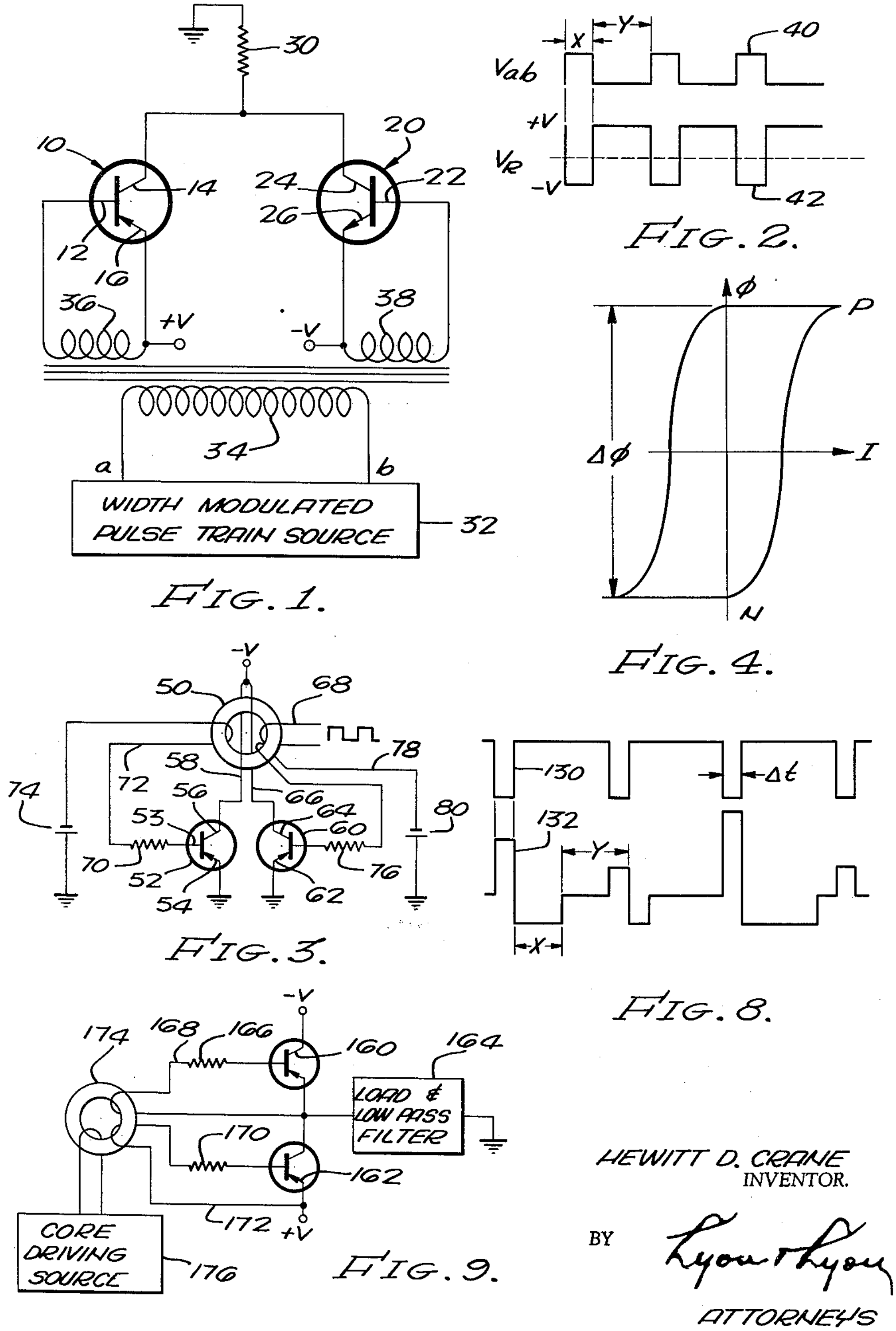
FIGURE 1 is a circuit diagram of an illustrative amplifier demodulator in accordance with this invention.
FIGURE 2 is a wave shape diagram of typical input voltages applied to the apparatus shown in FIGURE 1 and the output voltage obtained in response.
FIGURE 3 is a circuit diagram of an oscillator shown to assist in an understanding of the invention.
FIGURE 4 is a wave shape diagram of a hysteresis loop shown to assist in an understanding of this invention.
FIGURE 8 is a wave shape diagram shown to assist in an understanding of the operation of the invention shown in FIGURE 7.
FIGURE 9 is a circuit diagram of yet another embodiment of the invention.

As pointed out in the brief description above, in accordance with this invention, a varying amplitude signal is first converted to a representative pulse-width modulated pulse train. This pulse train is then applied to an amplifier circuit wherein voltage is applied across a load with a constant amplitude but with alternately reversing polarity in response to the successive pulses of the pulse-width modulated train. First consider the circuit diagram of an illustrative amplifier demodulator in accordance with this invention, which is shown in FIGURE 1. This will include a first and second transistor 10, 20, each of which has respectively base electrodes 12, 22, collector electrodes 14, 24, and emitter electrodes 16, 26. The symbol for the transistor 10 represents the PNP type of transistor. The symbol representing the transistor 20 is of the NPN type. As is well known these transistor types are achieved by different geometrical arrangements of the impurity type materials. The use of NPN and PNP type transistors should not however be construed as a limitation upon the invention since, as will be subsequently shown herein, the desired results may be obtained with the same types of transistors.

The collectors 14, 24 are connected to a load 30, which is here represented as a resistor. The load is connected to ground. The emitter 16 is connected to a positive voltage source, designated as +V, and the emitter 26 is connected to a negative voltage source, designated as −V. A width-modulated pulse train source 32 is connected to the primary 34 of a transformer. The transformer has two secondary windings, respectively, 36, 38. The secondary winding 36 is connected between the base 12 and the emitter 16, and the secondary winding 38 is connected between the base 22 and the emitter 26.

The input voltage which is applied to the winding 34 will be designated as $V_{ab}$. This input voltage is represented by the wave shape 40 in FIGURE 2. The voltage across the load 30, designated as $V_R$, is represented by the wave shape 42 in FIGURE 2. When the square-wave signal $V_{ab}$ is positive, the NPN transistor 22 conducts (in saturation), and the collector assumes the value of the voltage −V. When the square-wave signal has a negative value, the PNP transistor 10 conducts (in saturation), and its collector assumes the value of +V. It is desirable to apply a sufficiently high amplitude voltage $V_{ab}$ to insure that whichever transistor conducts, does so in saturation, regardless of the value of the load 30. Thus, the load may be considered to be driven from a constant voltage source.

The duration of transistor 10 conduction time is represented in FIGURE 2 by the letter y. The duration of transistor 20 conduction time is represented in FIGURE 2 by the letter x. If the conduction times are equal, i.e., if $x=y$, then the average voltage $V_R=0$. In general, the average output voltage is $$V_R=\frac{V_x-V_y}{x+y}$$

where V is the magnitude of the voltage and x and y are the two conduction times. Suppose that the conduction times or intervals x, y are modulated by the input signal so that $$x=\frac{a}{V_0-V_{in}}$$

where a, $V_0$ are constants $$y=\frac{a}{V_0+V_{in}}$$

With zero input ($V_{in}=0$) then $$x=y=\frac{a}{V_0}=\text{pulse-width duration T}$$

Otherwise, $V_{in}$ causes x to increase and y to decrease, as indicated. By substituting the expressions for x and y in the formula for the average voltage $V_R$, the output voltage is:

$$V_R=V\left[\frac{\frac{a}{V_0-V_{in}}-\frac{a}{V_0+V_{in}}}{\frac{a}{V_0-V_{in}}+\frac{a}{V_0+V_{in}}}\right]=\left(\frac{V}{V_0}\right)V_{in}$$

The average voltage $V_R$ is in this manner linearly related to the input voltage. This represents mathematically one approach for establishing a linear relationship between the average output voltage and the input voltage.

The functional relation of x, y to $V_{in}$, just shown, is not the only one that yields a linear output relation. If $$x=T+\beta V_{in}$$

where T=a fixed time interval and β=a constant;

$$y=T-\beta V_{in}$$

then by substituting for x and y in the original equation for the average voltage $V_R$ $$V_R=V\left[\frac{T+\beta V_{in}-T+\beta V_{in}}{T+\beta V_{in}+T-\beta V_{in}}\right]=\frac{\beta V}{T}V_{in}$$

and the relationship is again linear. This represents mathematically a second approach for establishing a linear relationship between the average output voltage and the input voltage.

Before considering modulation methods designed to exemplify the two approaches, consider the following. If $V_{in}=0$, then $x=y=T$, or the frequency of the square wave is $$f_0=\frac{1}{2T}$$

Assume, for audio amplification, that this is approximately 100 to 200 kc. In the first approach, as the input signal modulates the relation of x, y, the fundamental frequency changes as $$f=\frac{1}{x+y}$$

$$=\frac{1}{\frac{a}{V_0-V_{in}}+\frac{a}{V_0+V_{in}}}$$

$$=f_0(1-v^2),\text{ where }V=\frac{V_{in}}{V_0}$$

In the second approach, the fundnamental frequency $$f=\frac{1}{x+y}=\frac{1}{T+\beta V_{in}+T-\beta V_{in}}=\frac{1}{2T}$$

When $V_{in}=0$ $$f_0=\frac{1}{2T}$$

and the fundamental frequency is constant. In this manner, for the first approach, the fundamental frequency varies when the input signal varies but in the second approach, the fundamental frequency remains constant with variations of the input signal.

In either case, as the input signal is applied, input frequency components appear in the output along with a "high" frequency sideband spectrum. The "high" frequency current develops due to the fundamental frequency of sampling the input current. The fundamental frequency is a relatively high frequency compared to the frequency of the input signal. Since only input-frequency currents are of interest in the output, it is desirable to insert in series with the load a "low-pass filter" which will prevent high-frequency currents from flowing. In principle, then, with no input signal, no output current flows, and there is zero power dissipation. However, "low" frequency currents flow unimpeded by the filter. It is important to note that the low-frequency currents are the same, with or without the filter, and that the filter is used only to prevent unnecessary high-frequency power dissipation (in the load).

In principle, the maximum output voltage occurs when $x=0(V_R=+V)$ or $y=0(V_R=-V)$. Thus, the largest sine-wave voltage is 2V peak to peak. This leads to an audio-power output of $$\frac{V^2}{2R}$$

FIGURE 3 is a circuit diagram of a well-known oscillator which is shown to assist in an understanding of this invention. This includes a magnetic core 50, having a toroidal shape. This magnetic core may be made of any suitable magnetic material, which may be either permalloy or ferrite material which has a substantially rectangular hysteresis characteristic. This hysteresis characteristic is illustrated by the wave shape shown in FIGURE 4. The first transistor 52 in FIGURE 3 has its emitter 54 connected to ground. Its collector 56 is connected to one end of a first coil 58 (shown as having one turn). The coil is inductively coupled to the core 50 and has its other end connected to the source of negative potential, designated as −V. A second transistor 60 has its emitter 62 connected to ground; its collector 64 is connected to one end of a second coil 66, shown as one turn. This second coil is also inductively coupled to the core 50, as is the first coil 58, but with a relatively opposite coupling sense. The other end of the coil 66 is also connected to the negative source of potential −V. Both transistors are of the same type, namely, PNP.

The base 53 of transistor 52 is connected through a resistor 70 to one end of a coil 72. This coil is inductively coupled to the core 50 and has its other end connected to a bias battery 74, which in turn is connected to ground. The base 63 of transistor 60 is also connected through a resistor to one end of a coil 78. The coil is inductively coupled to core 50 and has its other end connected to a bias battery 80, which in turn is connected to ground. The sense of the coupling of the windings 72, 78 on core 50 is relatively opposite for reasons which will become clear with the explanation of the operation. Initially, the base bias may cause both transistors to attempt to become conductive, but the one that does conduct is determined by whether the core 50 is in the P or N state of magnetic remanence (see FIGURE 4). The magnetic core can be driven from the P state of magnetic remanence to the N state, for example, by collector current flowing through the one of the two coils 58, 66 coupled to the core with the proper polarity. This will induce opposite polarity voltages in the coils 72, 78. These voltages will bias off one transistor and will cause the other to conduct in saturation. When the core has been driven to the N state of magnetic remanence, then the other transistor can commence to conduct in saturation to drive the core back to P, and the transistor employed to drive the core to N is biased off. The bias batteries 74, 80 are employed to insure that the oscillator is self starting. However, these may not be necessary with some types of transistors.

The frequency of this oscillator is very simply determined. At any instant, the voltage across a winding is $$N\frac{d\phi}{dt}$$

where N is the number of coil turns and $$\frac{d\phi}{dt}$$

is the rate of change of flux through the winding. If transistor 52 is conducting, then the voltage across the first coil 58 is just the supply voltage V. Therefore, $$V=N\frac{d\phi}{dt} \text{ or } T=\frac{N}{V}\Delta\phi$$

That is, it takes a time T to switch $\Delta\phi$ flux in the core. If the core were initially in its N saturation state, then it would take ΔT seconds to switch it to its P saturation state, where $\Delta\phi$ represents the difference in flux between its two states. When the core reaches its P saturation state, no more flux can be switched, and the circuit operates to shut off transistor 52 and render transistor 60 conductive, returning the core to its N state of saturation in another T seconds. Therefore, the oscillation frequency is $$f=\frac{1}{2T}=\frac{V}{2N\Delta\phi};T=\frac{1}{2f}=\frac{N\Delta\phi}{V}$$

Thus, the frequency is linearly related to the collector voltage, or, more pertinently, the period of oscillation, T, is inversely proportional to V.

Figure 5:
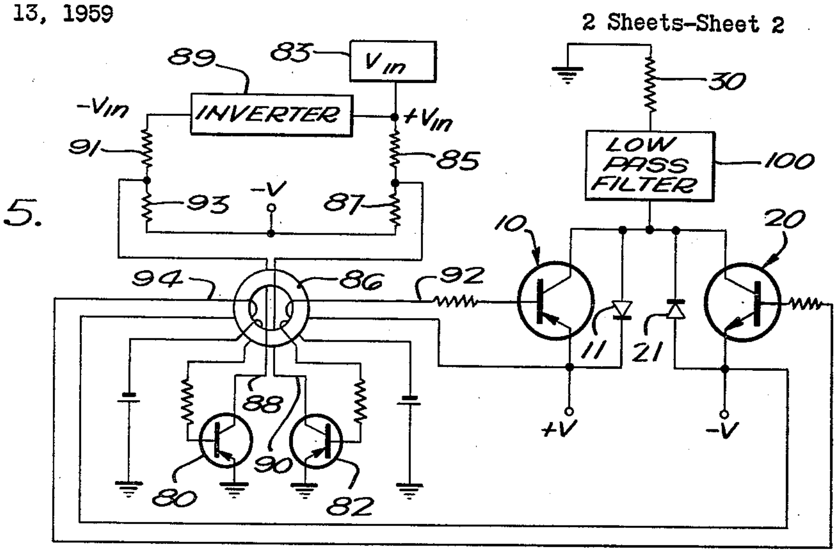
FIGURE 5 is a circuit diagram of an embodiment of the invention.

FIGURE 5 is a circuit diagram of one embodiment of the invention. If the collectors 56, 64 of the transistors 52, 60, shown in FIGURE 3, were returned to different voltages instead of to the same voltage −V, then the square-wave voltage induced in an output coil 68, which is coupled to the core 50, would become asymmetrical. Thus, in FIGURE 5, the voltage $V_{in}$ from the source 83 is added to −V, using summing resistors 85, 87, respectively connected to the coil 90. The voltage $V_{in}$ is also inserted to become $-V_{in}$ by inverter 89 and is then added to −V by summing resistors 91, 93, which are respectively connected to coil 90. Thus, at any given instant the voltage applied to the respective collectors of the transistors 80, 82 will be $-V-V_{in}$ and $-V+V_{in}$.

The magnetic core 86 is one having substantially rectangular hysteresis characteristics. The first coil 88, which has $-V_{in}-V$ applied thereto, is coupled to core 86 and has its other end connected to the collector of the transistor 80. The second coil 90, which has $+V_{in}-V$ applied thereto is coupled to the core 86 in reverse sense to coil 88 and has its other end connected to the collector electrode of transistor 82. It will be appreciated that the structure consisting of the magnetic core 86, the two coils 88, 90, the two transistors 80, 82 are interconnected in the same manner as the structure shown in FIGURE 3 for the well-known type of oscillator. The difference is, however, in the combination of the input voltage $V_{in}$ with the voltage −V, whereby an unsymmetrical square-wave output is induced in each one of the output coils 92, 94, which is coupled to the core 86. Such unsymmetrical output voltage wave shape arises by virtue of the fact that the alternate conduction and nonconduction of transistors 80, 82 occurs for a time determined by the value of the voltage $V_{in}$, which is added or subtracted, as the case may be, to the voltage −V. This causes a greater or lesser amount of collector current to flow, which in turn drives a core 86 from one to the other magnetic saturation polarity within a greater or lesser interval. Effectively, therefore, the structure described thus far in FIGURE 5 represents the width-modulated pulse train source represented by a rectangle 32 in FIGURE 1. The wave shape induced in the output coils 92, 94 will therefore be represented by the wave shape 40 in FIGURE 2.

The output coils 92, 94 are connected between the bases and emitters of the transistors 10, 20, which correspond to the transistors 10, 20 in FIGURE 1 and perform the identical function described, namely, that of alternately reversing the polarity of the voltage applied across a load 30 with each voltage being applied for a time interval determined by the width-modulated pulses applied thereto. The low-pass filter 100 connects the collectors of transistors 10, 20 to the load 30. The load 30 is connected between the low-pass filter 100 and ground. A +V and −V operating potential is applied between the emitters of the transistors 10, 20 and ground. The output coils 92, 94 apply the signals induced therein to the transistors 10, 20. The positive-going pulses will turn on the NPN transistor and the negative-going pulses will turn on the PNP transistor.

The reason for using the low-pass filter 100 is to eliminate carrier power and to increase the efficiency of the system toward 100%. The filter prevents carrier current from flowing in the load. With $V_{in}=0$, there will be carrier voltage across the load and filter, but zero current, and, therefore, zero power.

A diode 11 has its cathode connected to the emitter of transistor 10 and its anode connected to the collector of this transistor. A second diode 21 has its anode connected to the emitter of transistor 20 and its cathode connected to the collector of this transistor. Since the invention is intended to amplify voltages with frequencies ranging from direct current on up, when $V_{in}$ is constant, then the load current should be constant in time, even with an alternating voltage pattern. The diodes are provided to insure a continuous D.C. current flow in the presence of a D.C. voltage input. Thus, when the $V_{in}$ is a D.C. voltage having a polarity to cause current to flow through load 30 to ground, transistor 10 conducts during the appropriate interval to provide the required current flow. When transistor 10 is cut off, due to the alternating pattern of the input control signals, the filter causes the common collector connection thereto to raise to a high negative voltage due to a "kickback" effect caused by suddenly shutting off the current from the transistor 10. However, diode 21 keeps the common collector connection clamped at −V until transistor 10 is turned on again. This serves to insure that the proper alternating voltage pattern is applied to the load independent of the nature of the load current. Similarly, transistor 20 and diode 11 insure constant current flow for a reversed polarity value of $V_{in}$. It is to be noted that because the transistors are bilateral devices, under certain circumstances, the diodes are not always needed. Thus, omitting the diodes, when, for example, transistor 20 is cut off, the common collector connection tries to go positive. But as it reaches +V, the transistor 10, which is being turned on, will conduct in the reverse direction. Similarly, when transistor 10 is cut off, the common collector connection tries to go negative, but as it reaches −V, transistor 21 will conduct in the reverse direction as it is being turned on. An embodiment of the invention which was built did operate in this manner without diodes. If the transistors 10, 20 are replaced by tubes, however, then diodes are absolutely necessary.

Figure 6:
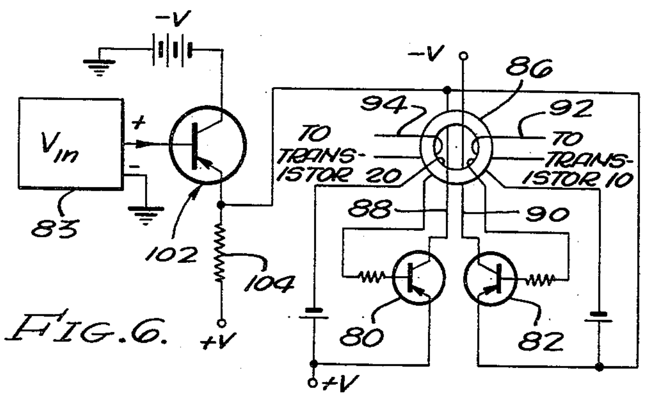
FIGURE 6 is a circuit diagram of another embodiment of the invention.

Reference is now made to FIGURE 6 of the drawing, which shows a circuit diagram of an arrangement for having a single-input point for the voltage $V_{in}$ from the source 83 to the apparatus which converts it to width-modulated pulses. It will be apparent that the configuration and interconnection of the transistors 80, 82, the first and second coils 88, 90, and the magnetic core 86 are substantially identical with the arrangement shown in FIGURE 5, and therefore these will not be described in the same detail as previously. The voltage $V_{in}$ is applied from the source 83 to the base of the transistor 102. The emitter of the transistor 102 is connected to ground through a load resistor 104. The output $V_{in}$ is derived from the emitter and is applied to the emitter of transistor 82 and also to one end of the first coil 88, the other end of which is connected to the collector of the transistor 80. The emitter of the transistor 80 has a potential +V applied thereto, and the second coil 90 has the potential −V applied to its other end and therethrough to the collector of the transistor 82. Therefore, the current drawn through transistor 80 is a function of the voltage $(+V-V_{in})$, and the current drawn through the transistor 82 is a function of the voltage $(-V-V_{in})$. Effectively, therefore, the transistor 80 will conduct for a period proportional to $$\frac{1}{V-V_{in}}$$

which equals $x$, and transistor 82 will conduct for a period proportional to $$\frac{1}{V+V_{in}}$$

which equals $y$.

Figure 7:
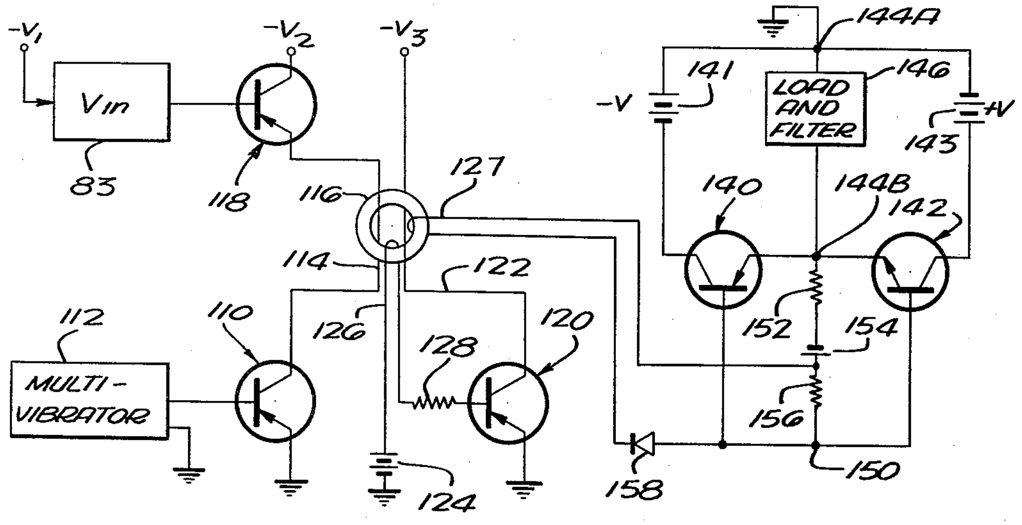
FIGURE 7 is a circuit diagram of another embodiment of the invention.

Attention is now directed to the circuit diagram of another embodiment of the invention which is shown in FIGURE 7. In the arrangement thus far described, the voltage varies with $V_{in}$, so that time is a function of $$\frac{1}{V_{in}}$$

or in inverse relationship is presented. In the second approach, shown previously mathematically, it is desired that time should vary as $V_{in}$; therefore, $V_{in}$ must be made to affect flux. The circuit shown in FIGURE 7 functions to provide the desired result. Transistor 110 operates in the nature of a gate which is enabled to conduct each time a pulse of the proper polarity is applied thereto from a multivibrator 112. Multivibrator output is applied to the base of transistor 110. The emitter of transistor 110 is connected to ground potential; the collector of transistor 110 is connected to a first coil 114, which is coupled to the core 116. The other end of the first coil 114 is connected to the emitter of a transistor 118. A first voltage source $-V_1$ is connected in series with the source of voltage $V_{in}$, which is represented by the rectangle 83, which in turn is connected to the base of transistor 118. Thus, the applied voltage is $V_{in}$ and a constant voltage $-V_1$. The collector of transistor 118 is connected to a second source of negative potential $-V_2$. A transistor 120 has its collector connected to a second coil 122, which in turn is connected to a third negative potential source $-V_3$. The emitter of transistor 120 is connected to ground. A bias source 124 is connected to a third coil 126, which is inductively coupled to the core 116. The other end of this third coil 126 is connected through a current-limiting resistor 128 to the base of the transistor 120.

The transistor 110 is gated on by an output pulse from a multivibrator 112 and will stay in a conductive condition for a time determined by the pulse width of the output from multivibrator 112. The multivibrator 112 may be a circuit, such as shown in FIGURE 3, which provides a regularly occurring output pulse train having pulses with the identical width or duration. Thus, gate 110 is periodically enabled to conduct for the same interval. The amount of current which flows during conduction, however, is determined by the amplitude of the signal $V_{in}$, which is added to $-V_1$. The core 116 will thus be driven towards saturation in the opposite polarity from the one in which it initially is set an amount determined by the amount of current passing through the first coil 114, which in turn is a function of the sum of the voltages $V_{in}$ and $-V_1$.

Immediately following the termination of conduction by transistor 110, transistor 120 is enabled to conduct. The rate of return to saturation of the core in response to current passing through coil 122 is constant. This means that $d\theta/dt$ is constant, or $V/N$ is constant where V is the voltage across the coil 122 and N is the number of turns. The transistor 120 is maintained nonconductive while transistor 110 is conductive by virtue of the coupling of the third coil 126 in the core 116. During the time the core is being driven from the first coil 114, the voltage induced in the third coil 126 biases off the transistor 120. When transistor 110 is rendered nonconductive then the core 116 returns to the remanent flux condition from which it was driven. This induces a potential in the coil 126, which overcomes the bias of battery 124 and biases the transistor base negative and enables the transistor to commence conduction to restore the core 116. Once transistor 120 commences conducting, it will regeneratively maintain itself conducting by the coupling of the coils 122 and 126 to the core 116 until the core has been returned to saturation in the original state.

Reference is now made to FIGURE 8, which is a wave shape diagram shown to assist in an understanding of the operation of the structure shown in FIGURE 7. The multivibrator 112 provides output pulses which occur at the carrier frequency (which may be 100 kc., for example) and which have a desired pulse width $\Delta t$. The wave shape 130 represents the pulses which are applied to gate on the transistor 110. The transistor 110 will thus be rendered conductive for a small, fixed interval $\Delta t$ at each cycle (for example, one microsecond for a 100 kc. oscillator). During this period, an amount of flux is switched in core 116 proportional to the quantity $(V+V_{in})\Delta t$ volt microsecond. Immediately following this short period, transistor 120 conducts and removes this flux at a fixed rate proportional to $V_3$. Therefore, the time to remove this flux, indicated by $x$ on wave shape 132, is proportional to $(-V_1+V_{in})$. The time $y$ remaining until the end of the next input terminal $\Delta t$ is proportional to $(-V_1-V_{in})$. The wave shape 132 is that for the voltage induced in the output coil 126, shown in FIGURE 7. Effectively, it may be said that the wave shape 132 represents a pulse train $V_x$ and $V_y$ of alternate opposite-polarity pulses which may be applied to the subsequent amplifying apparatus for demodulation.

As shown in FIGURE 7, transistor 120 removes flux at a rate proportional to $V_3$. However, the flux inserted in core 116, by transistor 110, is proportional to $$(-V_1+V_{in})$$

Actually, these voltages ($V_1$ and $V_3$) may be the same. It is only necessary that the necessary parameters (such as duration $\Delta t$, basic repetition frequency, turns on coils 114, 122, etc.) be adjusted so that $x=y$ if $V_{in}=0$.

A two-coil output-voltage pickoff scheme from the core 116 may be employed, such as is shown in FIGURES 5 and 6. However, still another arrangement using a single coil is shown in FIGURE 7. There, the two transistors 140, 142 have their collectors connected to potential sources 141, 143, respectively. The two potential sources 141, 143 are connected to one load terminal 144A, which is also connected to ground. The load 146, which may include a low-pass filter, if desired or required, is connected between the two load terminals 144A, 144B. The load terminal 144B is connected to the two emitters of the transistors 140, 142. An inductive load, such as a loudspeaker voice coil, is inherently a low-pass filter, and, therefore, may not require an extra low-pass filter, such as the one represented by the rectangle 100 in FIGURE 5.

Between the load terminal 144B and a common base junction 150, there are connected in series a first resistor 152, a bias source 154, and a second resistor 156. The bias 154 is poled to maintain transistor 142 conductive in saturation in the absence of an input of the proper polarity being received over the output coil 127. This output coil has one end coupled through a diode 158 to the bases of the respective transistors 140, 142. The other end is connected to the junction between resistor 156 and bias source 154. Diode 158 insures that the only current flow that occurs in coil 127 is such as to bias the emitter of transistor 140 positive with respect to its base, whereby as a necessary corollary, the emitter of transistor 142 will have applied thereacross a bias which opposes that of the bias source 154 and renders this transistor 142 nonconductive. Therefore, during the $x$ interval, transistor 140 conducts at saturation. During the remaining, or $y$, interval transistor 142 conducts at saturation. Effectively, therefore, the pulse train 132 shown in FIGURE 8 provides the same operation of the demodulating amplifier as is achieved by a pulse train 42, shown in FIGURE 2. The transistors are alternately rendered conductive at saturation for intervals determined by the pulse widths of the applied opposite-polarity pulses.

FIGURE 9 shows a circuit arrangement whereby instead of using two different types of transistors in the demodulator two of the same types of transistors may be used. By way of example, these are shown as PNP types, respectively 160, 162, but those skilled in the art can substitute other desired types. The load and low-pass filter 164 is connected between ground and the emitter of transistor 160 and collector of transistor 162. A negative operating potential is connected to the collector of transistor 160, a positive operating potential is connected to the emitter of transistor 162. The base of transistor 160 is connected through a resistor 166 to a coupling coil 168. The base of transistor 162 is connected through a resistor 170 to a coupling coil 172. The other ends of coils 168, 172 are respectively connected to the emitter of transistors 160 and 162. Coils 168 and 172 are both coupled with opposite relative senses to a magnetic core 174. This core is driven from a driving source 176 by any of the previously described methods.

In view of the opposite coupling sense of the coils 168, 172, the voltage induced in them during any given drive of the core 174 will have the proper polarity to enable only one of the two transistors to conduct in saturation. Thus, the mode and theory of operation of this arrangement is as has been described previously herein.

There has accordingly been described and shown hereinabove a novel, useful arrangement for amplifying signals wherein the signals to be amplified are converted to a train of representative width-modulated pulses. This train is applied to a subsequent demodulating amplifier wherein two transistors are alternatively rendered conductive at saturation for intervals determined by the width-modulated pulses and also serve to apply voltages across a load with alternatively opposite polarities controlled by the transistor conducting at that time. Therefore, the transistors operate as gates which are alternately open for an interval determined by the pulse width causing such opening whereby current is drawn through the load from the potential source.

The arrangement shown for amplifying signals is substantially independent of temperature variations, since any factors which affect the transistors or the cores are balanced out by the nature of the operation of the amplifier. A tremendous advantage is obtained in using the transistors in their on-off mode. Thereby, a great deal more power is controlled than would be normally dissipated. Thus, for example, transistors rated at one-quarter watt maximum dissipation have controlled a number of watts of power in the output. Linearity of operation is also obtained by the basic on-off control relations and without using either feedback or Class A type operation, although feedback may be added, if desired. The zero point of the amplifier, or D.C. voltage ($V_R$) across the load in the absence of signal ($V_{in}=0$), does not shift for the same reasons. There has also been described and shown herein a novel modulating system for converting an analog voltage into a pulse-width modulated voltage train. Such an arrangement has independent utility for applications wherein such conversions are required, for example, in a pulse-width modulation transmission system or for other purposes.

I claim:

1. In combination, first means for providing an input voltage having a variable characteristic representative of an input value, second means operatively coupled to the first means and responsive to the input voltage for producing first pulses having a first polarity and second pulses having a second polarity and having time durations dependent upon the value of the input voltage and for developing for each successive pair of first and second pulses a variable repetition rate dependent upon the value of the input voltage, and means operatively coupled to the second means for converting the first and second pulses into a resultant voltage having an amplitude corresponding to variations in the repetition rate of the first and second pulses.

2. In combination;

first means for providing an input voltage having a variable characteristic representative of an input value, second means operatively coupled to the first means and responsive to the variable input voltage for alternately producing first pulses of one polarity and second pulses of a second polarity opposite to the first polarity and for providing the first and second pulses with differences in duration dependent upon the value of the input voltage and for providing the first and second pulses with a variable repetition rate dependent upon the value of the input voltage, a load, third means responsive to the first pulses for producing a flow of current in a first direction through the load during the occurrence of the pulses of the first polarity, and fourth means responsive to the second pulses for producing a flow of current through the load in a second direction opposite to the first direction during the occurrence of the pulses of the second polarity to obtain the production across the load of a voltage having a magnitude related to the differences in duration of the first and second pulses.

3. In combination,
means for providing an input voltage having a variable characteristic representative of an input value,
first and second current control members,
saturable means connected to the first and second current control members and to the input means to produce a controlled flow of current alternately through the first and second current control members and to produce a variable duration for the flow of current through at least one of the current control members in accordance with the value of the input voltage and to provide a variation in the duration of the flow of current through the first and second current control members in accordance with the value of the input voltage,
a load, and
means operatively coupling the saturable means to the load to obtain a flow of current through the load in a first direction during the flow of current through the first current control member and to obtain a flow of current through the load in a second direction opposite to the first direction during the flow of current through the second current control member for the production of a voltage across the load in accordance with variations in the duration of the flow of current through the first and second current control members.

4. In combination,
first means for providing an input voltage having a variable characteristic representative of an input value,
first and second saturable means connected to the first means and operatively coupled to each other to become alternately conductive and to become conductive for periods of time having a variable repetition rate dependent upon the value of the input voltage and to become conductive for first intervals of time for the first pulses and second intervals of time for the second pulses where the difference between the first and second intervals represents the value of the input voltage,
a load,
means operatively coupling the first saturable means to the load to obtain a flow of current through the load in a first direction for a period of time dependent upon the interval of conductivity of the first saturable means, and
means operatively coupling the second saturable means to the load to obtain a flow of current through the load in a second direction opposite to the first direction for a period of time dependent upon the interval of conductivity of the second saturable means for the production across the load of a voltage dependent upon the differences between the intervals of conductivity of the first and second saturable means.

5. In combination,
means for providing an input voltage having a variable characteristic representative of an input value,
first and second current control members,
magnetically saturable means connected to the voltage means and the first and second current control members to obtain a flow of current alternately through the first and second current control members in accordance with the saturation of the saturable means and to obtain a difference in the time for the flow of current through the first and second members in accordance with the value of the input voltage and to provide a variable repetition rate for the alternate flow of current through the first and second current control members in accordance with the value of the input voltage,
a load,
third and fourth current control members, and
means coupled to the magnetically saturable means and the third and fourth current control members to obtain a flow of current through the third and fourth current control members in accordance with the flow of current through the first and second members and to obtain a flow of current through the load in a first direction during the flow of current through the third current control members and to obtain a flow of current through the load in a second direction opposite to the first direction during the flow of current through the fourth current control member for the production of a voltage across the load in accordance with differences in the duration for the flow of current through the third and fourth current control members.

6. In combination,
first means for providing an input voltage having a variable characteristic representative of an input value,
second means operatively coupled to the voltage means and responsive to the input voltage to produce alternately first pulses of a first polarity and second pulses of a second polarity opposite to the first polarity and to provide the first and second pulses with a repetition rate variable in accordance with variations in the value of the input voltage and to provide differences in the duration of the first and second pulses in accordance with variations in the value of the input voltage,
first and second current control members,
first voltage means biasing the first current control member to become conductive during the introduction of pulses of the first polarity to the first current control member,
second voltage means biasing the second current control member to become conductive during the introduction of pulses of the second polarity to the second current control member,
a load connected to the first and second current control members to receive a current in a first direction during the flow of current through the first current control member and to receive a current in a second direction opposite to the first direction during the flow of current through the second current control member, and
means operatively coupling the second means to the first and second current control members to obtain the flow of current through the individual ones of the first and second current control members in accordance with the polarity of the pulses from the second means.

7. In combination,
first means for providing an input voltage having a variable characteristic representative of an input value,
second means operatively coupled to the first means and responsive to the input voltage to alternately produce first pulses of a first polarity and second pulses of a second polarity opposite to the first polarity and to vary the duration of the second pulses in accordance with the value of the input voltage and to vary the repetition rate of the first and second pulses in accordance with the value of the input voltage,
the second means including a saturable magnetic core and at least first, second and third windings disposed on the core, at least one of the first and second windings being connected to the voltage means to control the rate of saturation of the core in accordance with the value of the input voltage,
the second means further including first and second current control members operatively coupled to the saturable magnetic core to obtain flow of current through alternate ones of the current control members in accordance with the saturable characteristics of the magnetic core and to obtain the production of the first and second pulses in accordance with the flow of current through the first and second current control members,
a load, and
third and fourth current control members,
means biasing the third current control member to produce a flow of current through the third current control member and through the load in a first direction upon the introduction of pulses of the first polarity to the third current control member,
means biasing the fourth current control member to produce a flow of current through the fourth current control member and through the load in a second direction opposite to the first direction upon the introduction of pulses of the second polarity to the fourth current control member, and
means including the third winding on the saturable magnetic core for introducing the first pulses to the third current control member and for introducing the fourth pulses to the fourth current control member.

8. The combination set for in claim 7,
in which the second means is operatively coupled to the first means to produce an increase in the duration of one of the first and second pulses and a decrease in the duration in the other of the first and second pulses and a difference in the duration of the first and second pulses in accordance with the value of the input voltage.

9. The combination set forth in claim 8,
in which the second means is operatively coupled to the first means to produce a variation in the duration of one of the first and second pulses in accordance with the value of the input voltage and to provide a substantially constant duration for the other one of the pulses for a difference in the duration of the first and second pulses in accordance with the value of the input voltage.

References Cited in the file of this patent

UNITED STATES PATENTS

| | | |
|---|---|---|
| 2,740,086 | Evans et al. | Mar. 27, 1956 |
| 2,780,782 | Bright | Feb. 5, 1957 |
| 2,795,656 | Hirsch | June 11, 1957 |
| 2,809,303 | Collins | Oct. 8, 1957 |
| 2,849,614 | Royer et al. | Aug. 26, 1958 |
| 2,864,961 | Lohman et al. | Dec. 16, 1958 |

FOREIGN PATENTS

| | | |
|---|---|---|
| 970,193 | France | June 7, 1950 |